United States Patent [19]

Wheadon

[11] 3,947,936

[45] Apr. 6, 1976

[54] COINING EXPANDED METAL POSITIVE LEAD-ACID BATTERY GRIDS

[75] Inventor: Ellis G. Wheadon, Anderson, Ind.

[73] Assignee: General Motors Corporation, Detroit, Mich.

[22] Filed: Aug. 12, 1974

[21] Appl. No.: 496,702

[52] U.S. Cl. ........................................ 29/2; 29/6.1
[51] Int. Cl.² .................... B23P 13/00; B21D 31/04
[58] Field of Search ............. 29/2, 6.1, 6.2; 136/36; 72/177

[56] References Cited
UNITED STATES PATENTS

| | | |
|---|---|---|
| 3,835,514 | 9/1974 | Pollack ..................................... 29/2 |
| 3,853,626 | 9/1974 | Daniel et al. ......................... 136/36 |

*Primary Examiner*—Willie G. Abercrombie
*Assistant Examiner*—Leon Gilden
*Attorney, Agent, or Firm*—Lawrence B. Plant

[57] ABSTRACT

Coining as-cast, Pb-Ca, expanded lead grids destined for use in positive, Faure-type, lead-acid storage battery plates. Expanded, as-cast, Pb-Ca strip is coined to remove all sharp edges and corners, to reorient the alloy's grain boundaries and to submerge nodal expansion cracks for increasing the cycle life of positive Pb-acid storage battery plates made therefrom.

1 Claim, 19 Drawing Figures

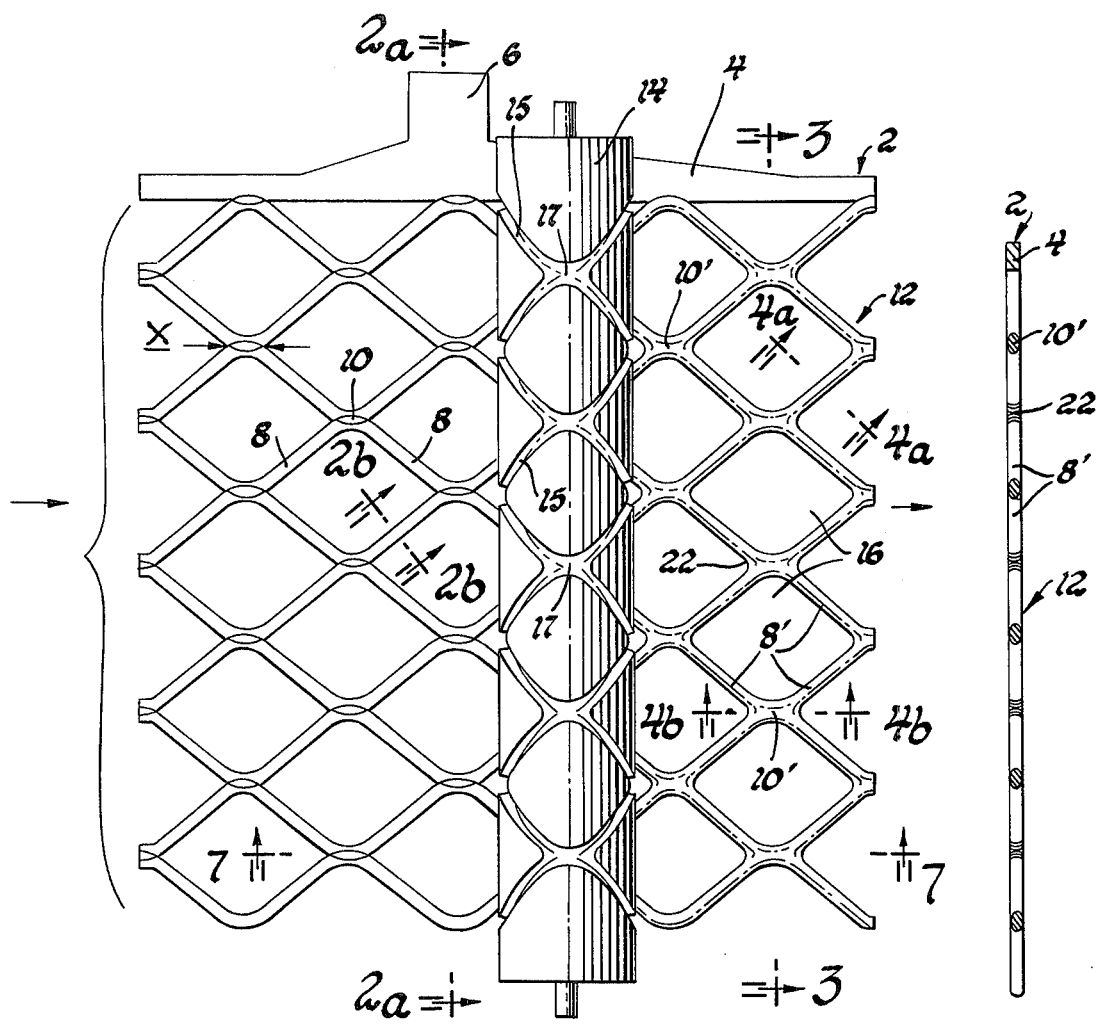
Fig.1
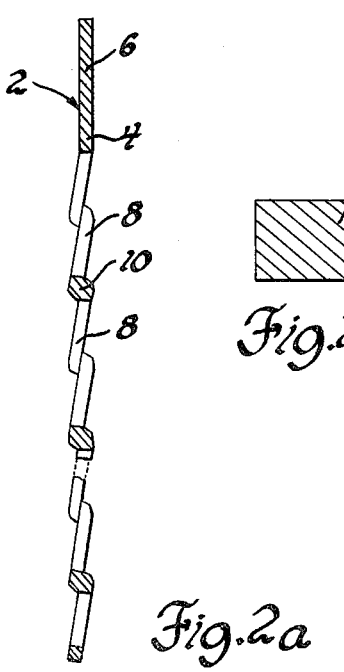
Fig.2a
Fig.2b
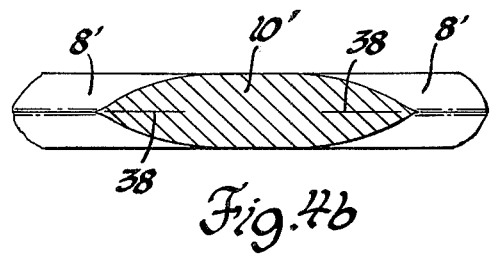
Fig.3
Fig.4a
Fig.4b

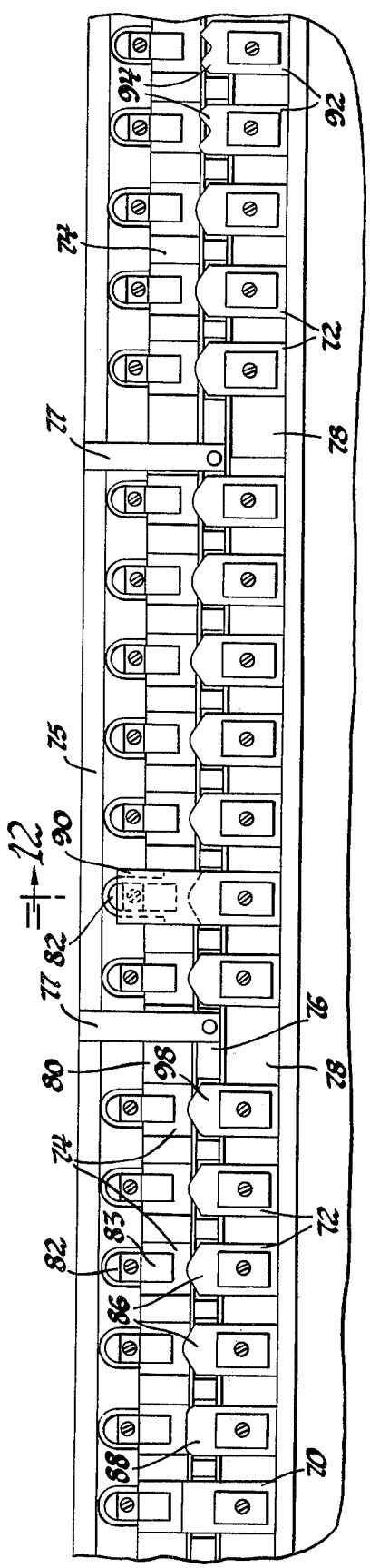

COINING EXPANDED METAL POSITIVE LEAD-ACID BATTERY GRIDS

BACKGROUND OF THE INVENTION

U.S. Pat. application Ser. No. 398,974, now U.S. Pat. Ser. No. 3,853,626 filed Sept. 20, 1973 in the names of Daniels et al and assigned to the assignee of the present invention, discloses a continous, in-line process for making a lead-acid storage battery grid having a current-collecting header of unexpanded strip and a reticulated portion expanded, guillotine-style, from the strip into a plurality of paste-retaining cells bounded by skeletal elements and nodes formed during expansion. This invention is an improvement to the Daniels et al method as it relates to positive grids made from Pb-Ca alloys, and the said Daniels et al patent application is intended to be incorporated herein by reference. Briefly, in the Daniels et al method, a ribbon or strip of lead (e.g., Pb-Ca alloy) is fed into a continous, in-line, guillotine-type, dual expansion machine and therein expanded along its longitudinal edges into two reticulated portions extending laterally from a central unexpanded portion from which headers and lugs are subsequently formed. The expanded strip has a V-shape or gull-winged configuration when viewed from its end, the wings of which are subsequently folded down as by plow and roller means so as to be in substantially the same plane as the unexpanded portion. The reticulated portions are subsequently uniformly stretched in a direction perpendicular to the central unexpanded portion by cooperating embossed and mating forming rolls. Finally, the reticulated portion is rolled so as to twist and flatten the nodes joining skeletal elements.

One of the advantages of such a process is that it can be coupled directly to the output of a continous strip casting machine such as the one described by R. D. Semmens in the article entitled "The Continuous Casting of Lead Sheet by the D.M. Process", Journal of the Australian Institute of Metals, Vol. 10, No. 1, Feb. 1965, pp. 40 – 44. Such a melt-to-plate scheme is illustrated in FIGS. 8 and 9 hereof and permits the continuous production of battery plates without any intermediate handling of individual grids. Such a melt-to-plate scheme has proven to be particularly useful in the manufacture of grids destined for negative plates as the negative plates are not subjected to the same corrosive attack and active materials growth seen by positive plates.

THIS INVENTION

On the other hand, the melt-to-plate scheme has not proven reliable in the manufacture of positive grids. In this regard, positive grids having long useful lives are not always so readily made from many as-cast alloy strips including lead-calcium alloy strips which have directionally solidified into large grains and continuous grain boundaries extending from one surface of the strip to the other. Positive grids expanded from such large-grained strips are short-lived in that they tend to fall apart after a relatively few charge - discharge cycles. The grids' failure is marked by separation of one tier of skeletal elements from the next, principally at the nodes joining the skeletal elements as well as by breakage of the skeletal elements themselves intermediate the nodes. These failures are the result of intergranular corrosion (i.e., along the alloy's grain boundaries) which quickly cuts through the alloys having the aforesaid continuous, straight-through grain boundaries. Casting finegrained strip without continuous, straight-through grain boundaries should alleviate the problem, but this is not always easy to do economically or to control on a production scale over an extended period of time, i.e., where casting equipment would be running continuously for several hours. Control-wise, it is possible that over the course of several hours of continuous casting, the grain size of a continuously cast strip will vary significantly from one end to the other, depending on fluctuations in the casting conditions.

It is desirable, therefore, to provide a system safeguard which insures that acceptable positive grids can be made continuously, regardless of grain size and grain boundary variations in the as-cast alloy and it is the principal object of this invention to provide such a safeguard.

Essentially, this invention comprehends coining positive grids expanded according to the Daniels et al process so as to work and reform the nodes and skeletal elements to make them more resistant to corrosion. In one form of the coining operation, the expanded portions of strip pass through a set of coining dies having a pattern of concave grooves and pockets formed therein which register respectively with the skeletal elements and nodes of the expanded portions leaving the flattening section of the expander. The coining dies work the as-expanded and flattened portions such that the metal thereof flows to assume the shape of the die pattern, thereby eliminating sharp edges and corners, reorienting and breaking up any continuous, straight-through grain boundaries and submerging any nodal expansion cracks in reforming the node.

Reforming the nodes is particularly important. In this regard, the expanding operation which shears the skeletal elements away from the strip leaves sharp corners where the segments meet and tears into the center of the node, leaving hairline cracks extending well into the node along the shear plane of the adjacent skeletal elements. During cycling of the battery, the positive paste grows with sulphation, thereby causing a further tearing of the node and opening up of the crack to corrosive attack at the grain boundaries on the node walls defining the crack. Coining the node according to this invention not only removes all sharp edges and corners therefrom, but closes off the crack by pressing the faces defining the crack back together and submerging it under the flowing metal being shaped in the die pocket thereby rendering the crack less accessable to battery acid. At the same time, the grain boundaries left on the outside surface of the node by expanding are reoriented and broken up so as to reduce the rate of intergranular corrosion inwardly via these grain boundaries. Lastly, the coining of the node reshapes it such that all sharp edges and corners are eliminated and merged together into less corrodible, rounded surfaces and fillets.

The grid produced by Daniels et al comprises a skeleton of expanded lead having an unexpanded, current-collecting top header portion and an expanded reticulated portion depending from the header. The reticulated portion includes a plurality of thin wire-like skeletal elements emanating from nodes which interconnect the several skeletal elements and are substantially thicker than the skeletal elements. Each node angles through the paste of the finished plate at an angle nearly normal to the plane of the plate. Each node has a thickness which is greater than the thickness of the original lead strip from which it was derived, is substantially less than twice the thickness of that lead strip, and has flat surfaces or plateaus laying in the principal planes of the grid. According to Daniels et al, the grid strip is conditioned after expansion, leveling and stretching to angularly orient each node by rotating it slightly and concurrently flatten those salient edges of the node which, by virtue of the node rotation, would otherwise project from the opposed faces of the grid. The process of the present invention adds an additional step (i.e., coining) to the Daniels et al process which modifies the structure and improves the corrosion resistance of positive plate grids made from directionally solidified, large-grained Pb-Ca alloys and the like.

The process of the present invention is described in more detail hereafter in connection with the drawings hereof in which:

FIG. 1 is a front elevational view illustrating coining a Daniels et al expanded lead strip grid according to this invention;

FIGS. 2a and 2b (enlarged) are sectional views in the directions 2a—2a and 2b—2b through the grid strip of FIG. 1, before coining;

FIG. 3 is a side sectional view in the direction 3—3 through the grid strip of FIG. 1, after coining;

FIGS. 4a and 4b are enlarged sectional views in the directions 4a—4a and 4b—4b through the coined portion of the grid strip of FIG. 1;

FIG. 10 is an enlarged elevational view of the expanding dies of the expander section of the apparatus shown in FIG. 8;

FIG. 11 is an enlarged plan view of the expander section of the apparatus shown in FIG. 8;

Figure 5:
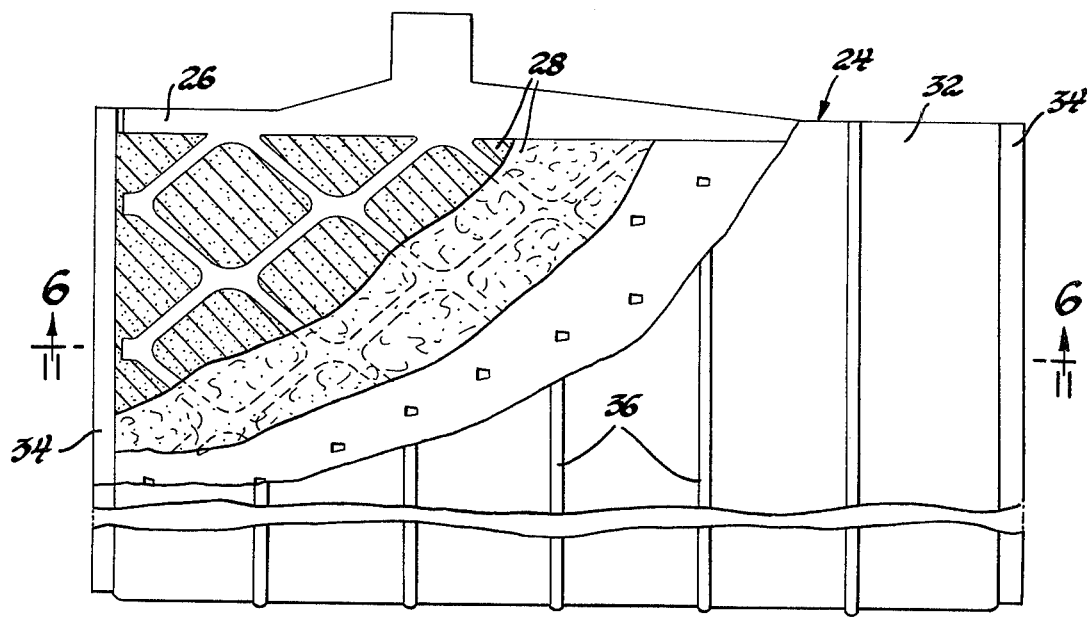
FIG. 5 is a partially broken-away, front elevational view of a separator-encapsulated, paper-bound, batter plate having a grid made in accordance with the present invention.

A preferred form of grid 2 (FIG. 1) made in accordance with this invention is expanded guillotine-style from both longitudinal edges of a ribbon of lead strip so as to have a currentcollecting header 4 and lug 6 of unexpanded strip and a reticulated paste-supporting portion 12 expanded from the sheet into a plurality of polygonal paste-retaining cells 16 depending from the header 4. The paste retaining cells are defined by rounded wire-like skeletal elements 8' (FIG. 4a) connected one to the other by cross-sectionally elliptical nodes 10' (FIGS. 3 and 4b). The elements 8' and nodes 10' meet at filleted junctions 22 (FIG. 1).

As indicated earlier, the coining operation of this invention is directed to overcoming the potentially disasterous effects of as-cast, directionally-solidified, large-grained, Pb-Ca grid alloy strip sometimes fed to the Daniels et al process. In such a process, Pb-Ca strip 40 (FIG. 8) is continuously cast (e.g., on drum caster C) and fed directly to a Daniels et al machine where it is expanded as described above and where crosssectionally rectangular, wire-like segments 8 are sheared and stretched from the strip 40 by reciprocating slitting and expanding dies/cutters 72 (FIGS. 8, 10, 11 and 12). The ribbon 40 is fed step by step to the cutters lengthwise thereof and parallel with the cutters and the side margins of the ribbon. As a result, a plurality of undulatory tiers of skeletal elements 8 are formed from each longitudinal edge of the ribbon advancing between the rows of progressive, reciprocating dies 72 which converge on the center of the strip 40 in the direction the strip is advanced. The expanded (i.e., reticulated) portions 12 of the strip extend like wings at an acute angle to the strip from which they are punched (see FIGS. 12 and 13). The several tiers are connected to the next adjacent tiers via nodes 10 which comprise unslit and unstretched portions of the sheet intermediate the skeletal elements 8 of each tier, the said nodes 10, immediately after expansion, being about twice the width of the skeletal elements 8 joining to form the node 10. The skeletal elements 8 intermediate the nodes 10 comprise portions of the strip's edges which have been peeled away therefrom and stretched to about 1.2 times their original length. Lead sheets useful with this technique vary in thickness from about 0.035 to about 0.05 inch and the width of the skeletal elements between about 0.025 inch and about 0.08 inch. The expanded strip is then leveled, stretched and flattened a la Daniels et al and finally coined according to this invention prior to pasting.

Figure 8:
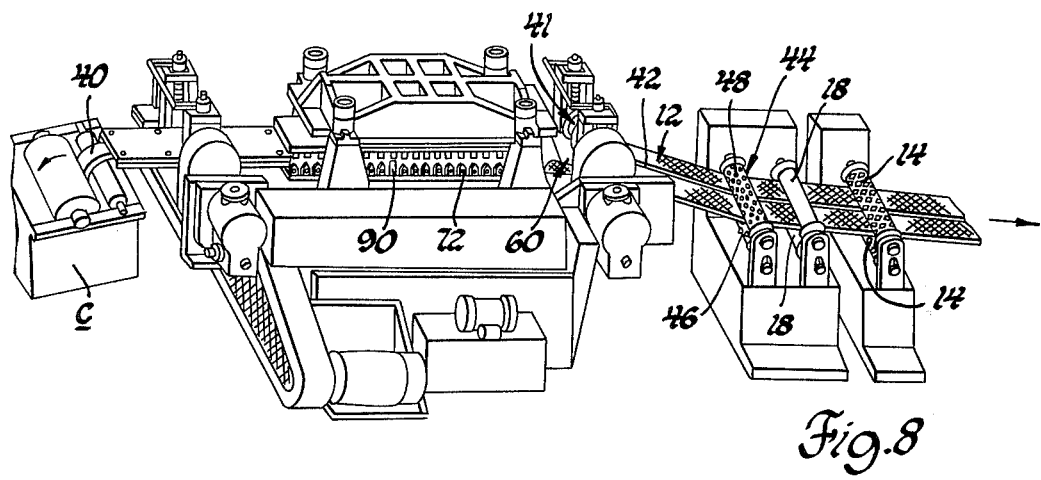
FIGS. 8 and 9 are perspective views illustrating apparatus for continuously making grid strips according to this invention.
Figure 9:
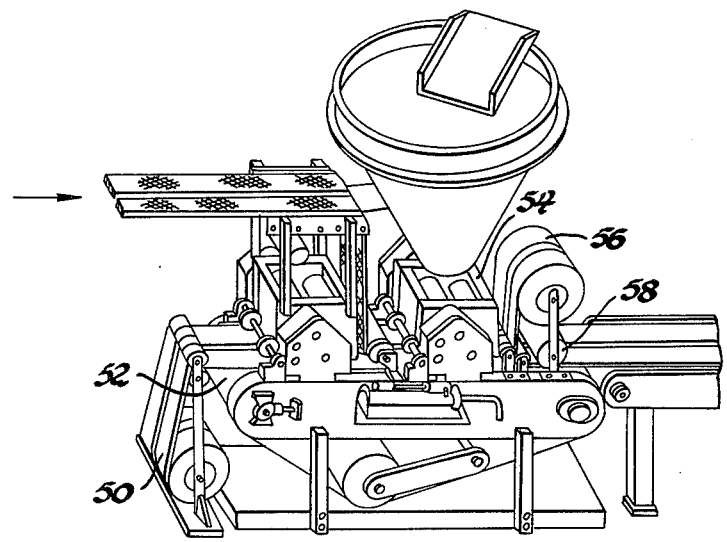
Figure 12:
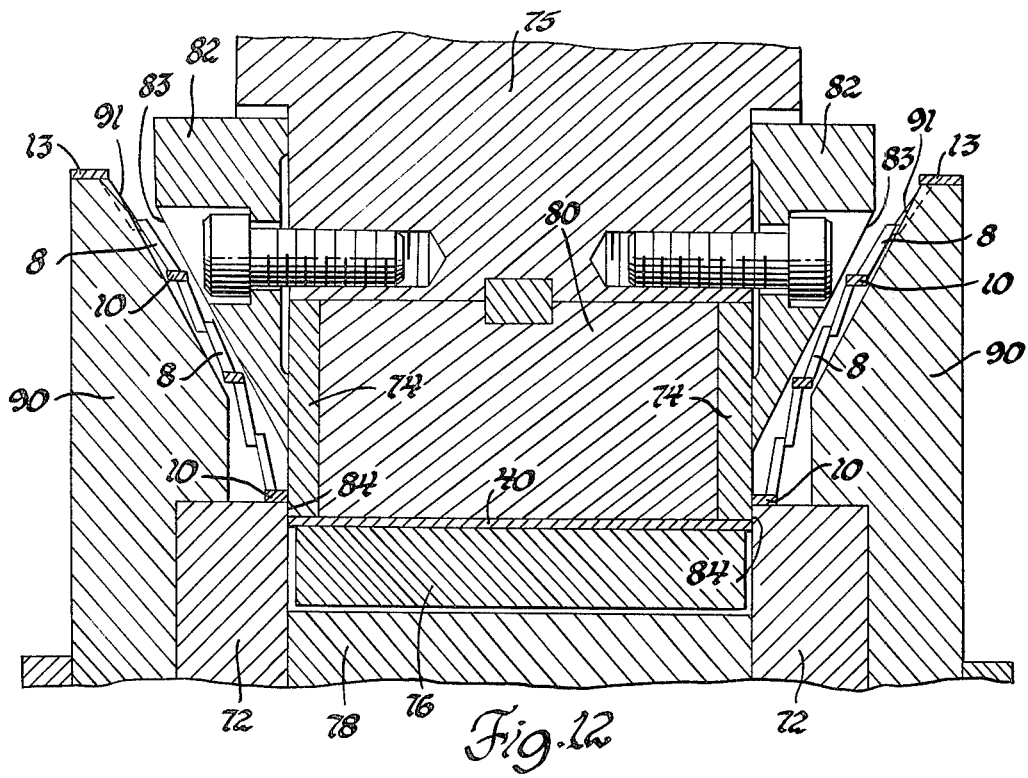
FIG. 12 is a sectional view taken along the line 12—12 through the die set and border straightener shown in side elevation in FIG. 10.

More specifically, the process is initiated by feeding a thin, narrow ribbon 40 of Pb-Ca alloy directly from a continuous strip caster like the drum caster C (FIG. 8) into a continuous, in-line, dual expansion guillotine-type expander (FIG. 8). FIGS. 10 - 12 show the expander in more detail and will be used to briefly describe the expansion that occurs therein. FIG. 10 is a side view showing basically the reciprocating dies 72, fixed position cutters 74 and the bed or stripper plate 76 on which the ribbon 40 slides as it advances through the expander. FIG. 11 is a plan view of the stripper plate 76 also showing the top faces 98 of the reciprocating dies 72 which move up and down through notches in the stripper plate 76. FIG. 12 shows a sectional view taken along the line 12—12 of FIG. 10 and includes a section through the expanded grid (not shown in FIG. 10). More specifically and moving from left to right on FIGS. 10 and 11, the moving strip 40 first engages guides 70 which align the strip 40 with the center line of the gauntlet dies 72 and cutters 74 ahead. The guides 70 reciprocate in unison with the dies 72 since all are fixed to a common die holder 78 which is driven up and down by appropriate means (not shown). The ribbon 40 rides atop a bed or stripper plate 76 which is fixed to the cutter-holder assembly 75 (though spaced therefrom) by means of straps 77 whereby the expanded portions are stripped from the dies 72 during the downward motion thereof. The cutters 74 are held tightly in position against the stationary block 80 by means of retainers 82 as best shown in FIG. 12, and the cutting and breaking action that occurs is accomplished by the sharp edges 84 of the cutters 74 when the reciprocating dies 72 push the longitudinal edges of the strip 40 up against the cutters and thereby peel portions of the edge away from the strip 40 forming the skeletal elements 8.

The dies 72 are so shaped at their top 86 as to cause both slitting and stretching of the lead peeled away from the edges of the strip 40. While a variety of shapes can be used for the top of the dies to effect the stretching, the semi-diamond shape shown is preferred. Each upward motion of the dies 72 forms one-half of a paste-retaining cell 16 with the remainder of the cell being formed downstream of that die during the formation of the next adjacent tier of skeletal elements 8.

When a lower border (see Daniels et al Ser. No. 398,974) is desired on the grid, the first increment of metal cut from the edge is only slit but not stretched appreciably. First flat-topped dies 88 are provided after the guides 70 for this purpose. With grids so made, the bottom border causes a greater tendency for the reticulated portion to curl and jam up in the expander before reaching the end thereof. To overcome this problem, a border straightener 90 is provided on one set of opposing dies 72 about midway the gauntlet of dies. As best shown in FIG. 12, the border straightener 90 prevents deleterious curling in two ways, either of which may be used alone or in combination with the other. First during the upward cutting stroke of the die 72, the nodes 10 of alternate segment tiers are forced between the beveled surfaces 91 and 83 of the straightener 90 and retainer 82, respectively, such as to be substantially aligned in the narrow space 93 between the surfaces 91 and 83. Secondly, the height of the straightener is adjusted to engage the bottom border 13 and force it upwardly thereby pulling out any deleterious curl developed in the reticulated portion at that stage of the expansion.

The dies 92 near the end of the gauntlet may include two diamond-shaped upper edges 94, as best seen in FIG. 10, for making grids such as described in U.S. Pat. application McCartney et al Ser. No. 399,109, filed Sept. 20, 1973 and assigned to the assignee of the present invention. These double diamonds form two half-cells per each stroke of the dies 92 in the same space as a die 72 forms a single cell 16.

The expansion process just described causes a tearing of the node 10 in the plane where the skeletal elements 8 forming a particular node 10 are sheared apart. This tearing takes the form of a hairline crack 38 in the shear plane extending into the node 10 at the corners X (FIG. 1) thereof. This crack is not a particular problem in negative grids but is the site of corrosive failure of positive grids as mentioned above.

Figure 13:
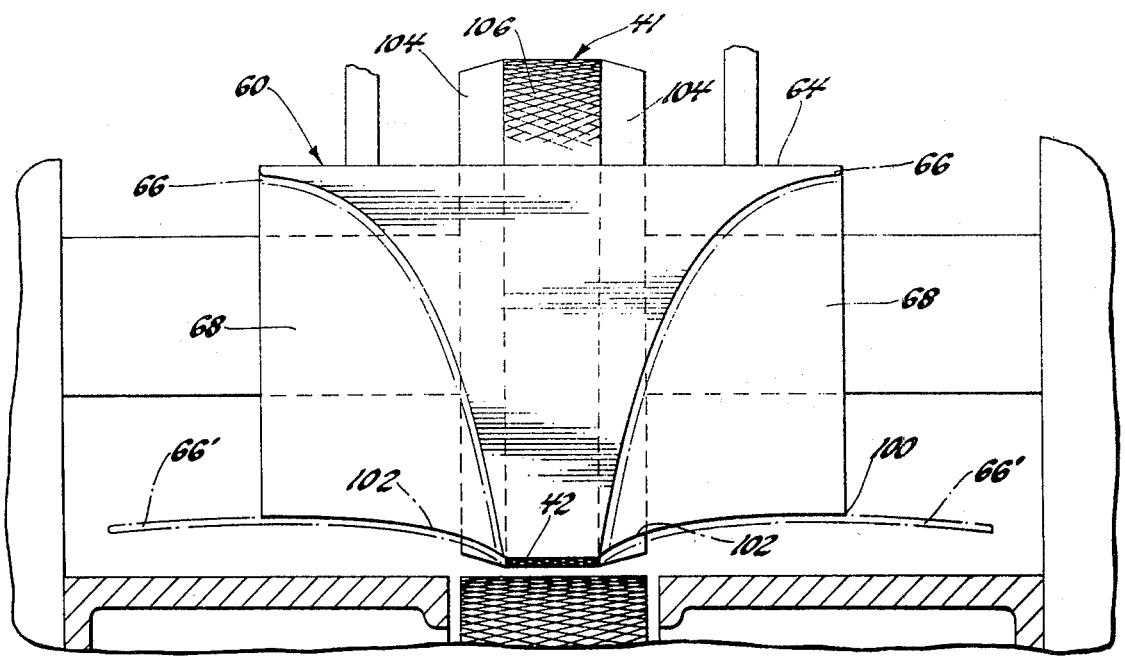
FIG. 13 is an enlarged front elevational view of the input end of the plow and leveling roller section of the apparatus shown in FIG. 8.
Figure 14:
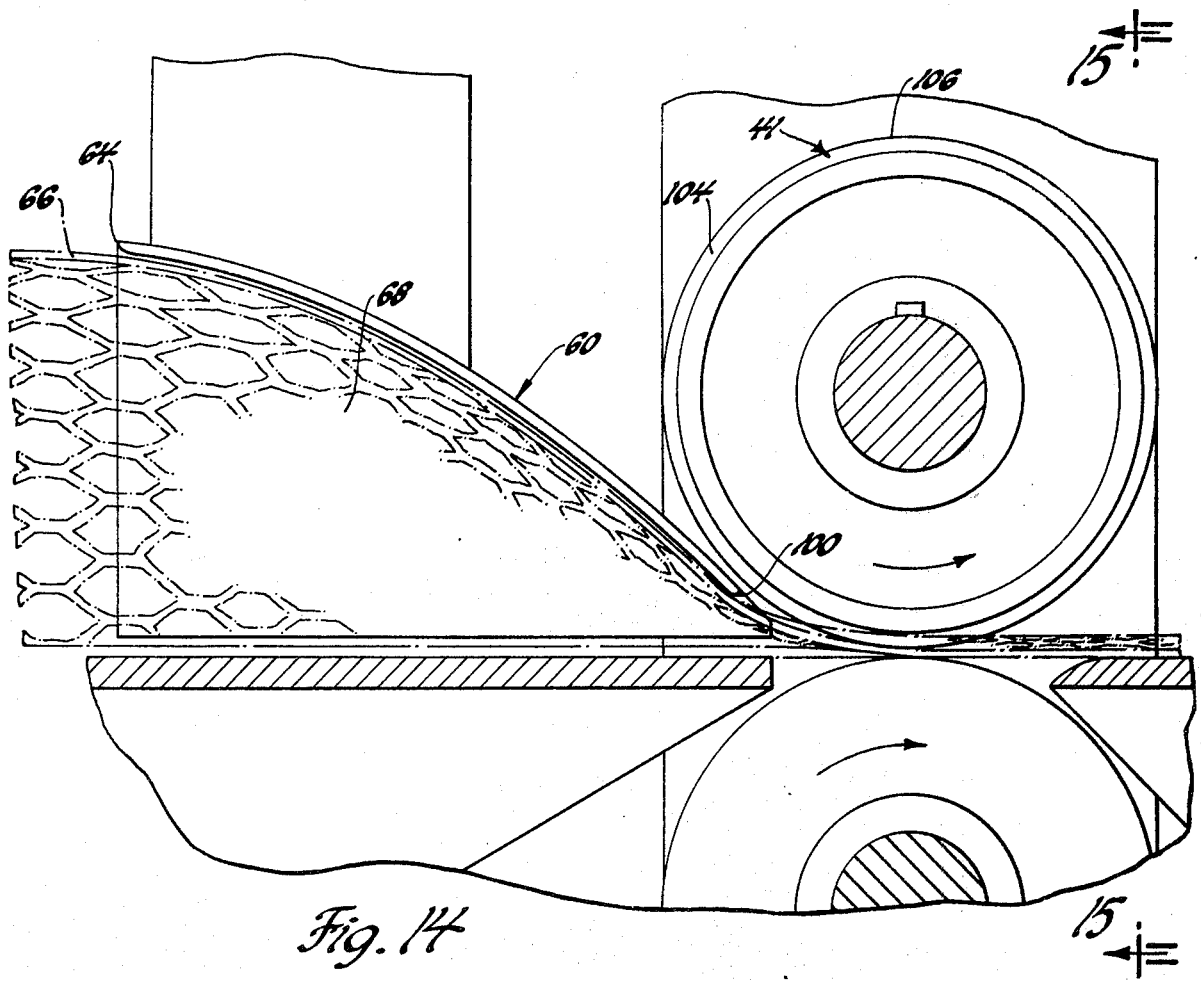
FIG. 14 is an enlarged side elevational view of the plow and leveling roller portion of the apparatus shown in FIG. 8.
Figure 15:
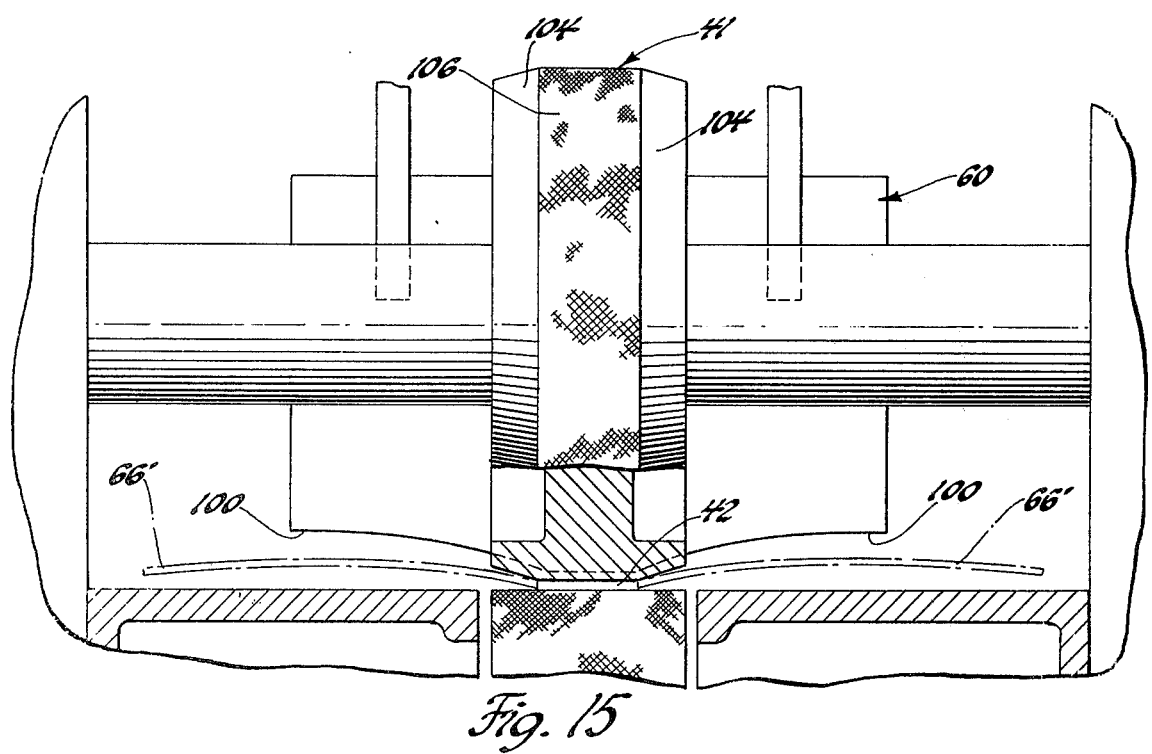
FIG. 15 is a transverse sectional view through the leveling roller taken in the direction of line 15—15 of FIG. 14.

Following expansion, and without substantially affecting the nodes 10, the reticulated portions are gradually laid down into substantially the same plane as the lead strip from which it was punched by advancing the expanded wings of the V-shaped strip beneath a plow 60 and beveled leveling roller 41, best shown in FIGS. 13 – 15. In this regard, FIG. 13 views the plow (and background leveling roller 41) from its inlet side 64 and shows in phantom the general configuration of winged strip 66 as it enters the plow 60. FIG. 14 shows a side elevation of the leveling system, plow and roller, while FIG. 15 shows a transverse section through the rollers, showing the curved surfaces 68 gently fold the reticulated wings 66' to a position more nearly coplanar with the center portion 42 on the exit end 100 of the plow. At this point, a slight hump 102 remains near where the wings join the center portion, which hump is substantially leveled out by subsequent engagement with the beveled (i.e., about 15°) portions 104 of the leveling and drive roller 41 (see FIG. 15). The cylindrical center portion 106 of the beveled roller 41 and outer surface of its coacting drive roller are knurled to firmly grab the center of the strip and drive it through the system. After plowing and leveling, the nodes 10 lay at a slight angle (i.e., about 2° – 4°) to the plane of the unexpanded strip remaining in the center.

Figure 17:
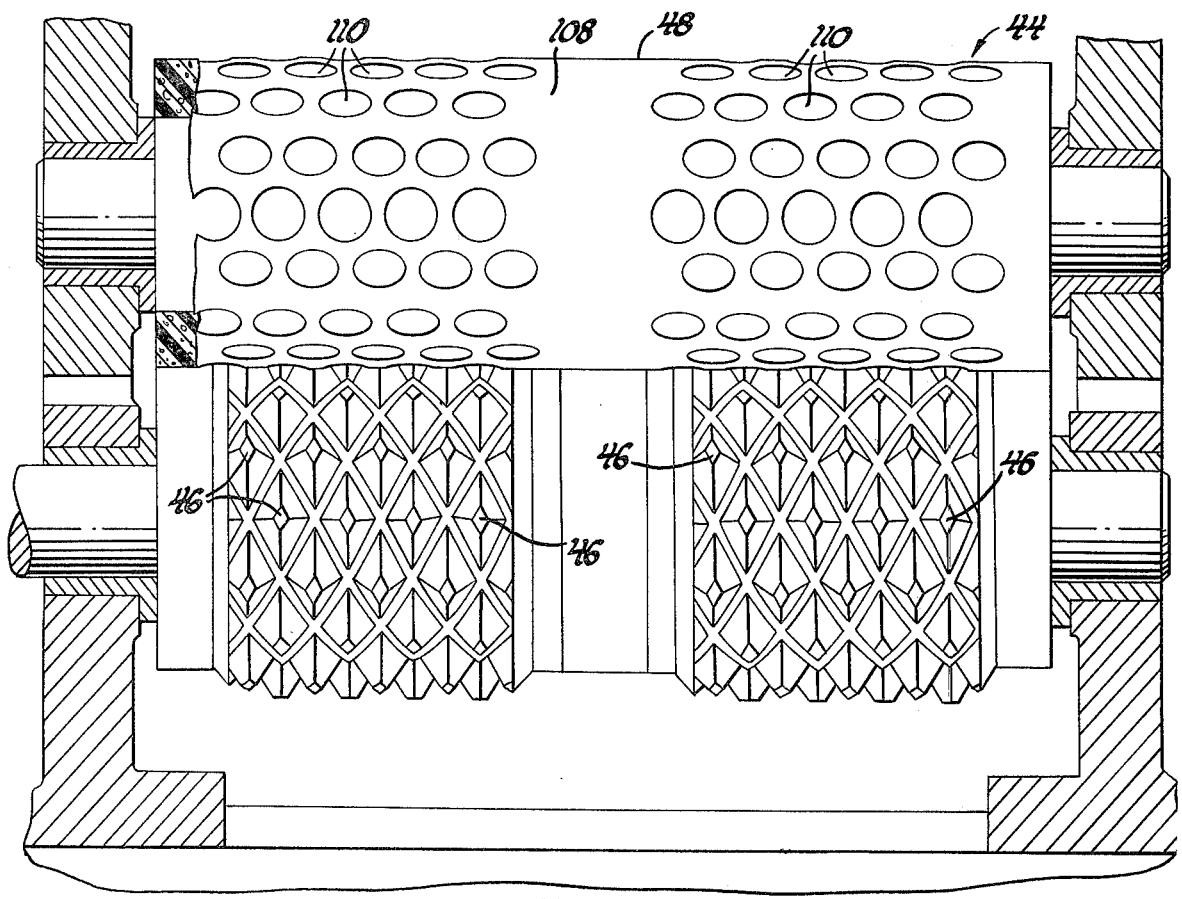
FIG. 17 is an enlarged front elevational view of the stretching rollers as seen in the direction 17—17 of FIG. 16.
Figure 16:
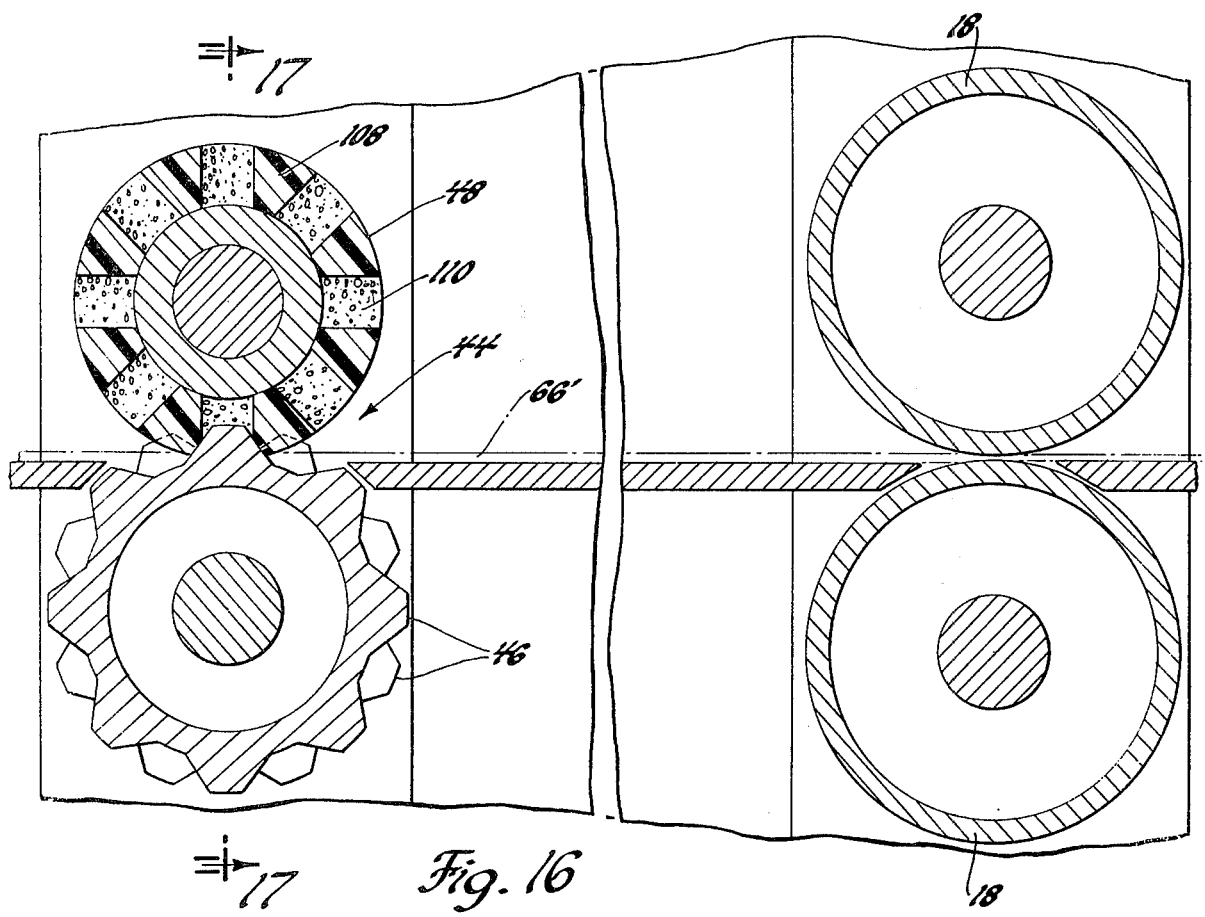
FIG. 16 is an enlarged side elevational view of the stretching and flattening rollers illustrated in FIG. 8.

Following the leveling operation, the reticulated portions are uniformly stretched by engaging each tier and pulling it in a direction directly away from the header. This stretching action slightly rotates the nodes 10 and makes the paste-retaining cell more equiaxed by elongating the minor axis of the cell (i.e., perpendicular to the header) and shortening the major axis of the cell (i.e., parallel to the header). A minor to major axis ratio of a least about 0.9 after stretching is preferred to assist in reducing vertical grid growth. As a result of this stretching, the total reticulated portion is extended by an amount equal to the summation of the increase in length of the minor axes of the cells in each of the several tiers making up the grid. This stretching is accomplished by feeding the level strip between a pair of forming rollers 44 (best shown in FIGS. 16 and 17), which stretch the reticulated portions in a direction about 90° from the unexpanded central portion. The forming rollers 44 include an embossed lower roller having a plurality of truncated pyramidal projections 46 which engage each of the cells of the reticulated portion. The opposing upper roller 48 is closely spaced from the lower roller and has a thick compressible polyurethane layer 108 including a plurality of holes 110 adapted to receive the projections 46. The polyurethane between the holes engages the skeletal elements and nodes forcing them downward toward the wide bases of the projections 46 to form each cell individually around the base of a projection 46 and thereby uniformly stretch the reticulated portions to the desired size.

Following stretching, the reticulated portions 12 are next passed through a set of rollers 18 in the direction of the major axis or, in other words, in a direction 90° to the direction of expansion. The rollers 18 comprise 6150 steel having a hardness of $R_c$ 48 – 52 and are spaced apart at least about 1.3 times the thickness of the lead strip. As a result, passing between the rollers causes still further rotation of the nodes to between about six and fifteen degrees and concurrently flatten into plateaus the outwardly projecting or salient edges of the nodes which had rotated to the outward faces of the grid. By this twisting and flattening, each node is significantly mechanically worked causing some flow and bulging of the node, but in a manner which is not so severe or harsh as to significantly damage the reticulated portion and shorten the useful life of the plates made therefrom.

Following flattening, the grids are coined in accordance with the present invention. In this regard, FIGS. 1, 3, 4 and 7 illustrate the transformation that occurs in the expanded portion after passing between the coining rollers 14 illustrated in FIGS. 1, 7 and 8. As indicated earlier, not all Pb-Ca grids need be coined, but rather only those expanded from strips which have solidified so as to have large grains and continuous grain boundaries extending from one surface of the strip to the other. However, inasmuch as the microstructure of a length of strip can vary considerably from one end to the other and since coining fine grained Pb-Ca alloy can do no harm, it is advisable to coin the entire length of an expanded strip to insure that no uncoined, large-grained, as-cast alloy finds its way into positive grids.

As illustrated in the drawings, coining cold forms the cross-sectionally (transverse) rectangular segments (FIG. 2b) into cross-sectionally (transverse) rounded or elliptical segments (FIG. 4a) and the cross-sectionally polygonal nodes 10 (FIG. 2a) to generally ellipsoidal shapes (see FIGS. 3 and 4b). The coining significantly cold works the metal, especially at the surface, thereby reducing the grain size and reorienting the grain boundaries to minimize the number of grain boundaries otherwise extending directly through the metal. Moreover, the coining operation removes all sharp edges and corners which are typically rapid corrosion sites. Lastly but quite significantly, the coining operation closes up the tear or crack 38 in the node 10 formed during expansion. In this regard, not only are the opposed faces defining the crack forced back into intimate contact, but lead flowing from other parts of the node tends to cover up the crack 38 and submerge it deep into the node 10 (e.g., see FIG. 4b).

Following coining, the expanded strips are continuously pasted by laying them on top of strips of perforated paper 50 (e.g., see Adams Ser. No. 347,326, filed Apr. 2, 1973) on a continuous belt 52, passing it under a paste dispensing apparatus 54 adapted to press a leady positive paste around the skeletal elements from one side of the grid, covering it with a second layer of paper 56, rolling it to a desired thickness (see rollers 58), drying the paste, forming (not shown) the headers and lugs from the center portion, separating the two pasted strips and finally segmenting each strip into individual plates. Forming of the headers and lugs from the center portion can be accomplished almost anywhere in the system, even before the expanders, if desired..

Figure 6:
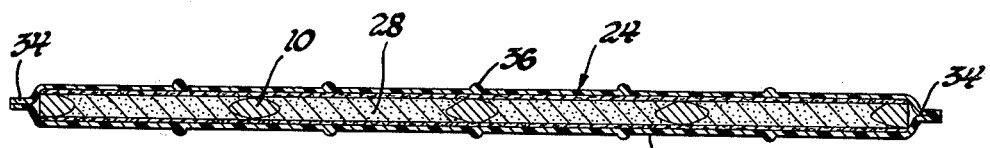
FIG. 6 is a sectional view taken in the direction 6—6 of FIG. 5.
Figure 7:
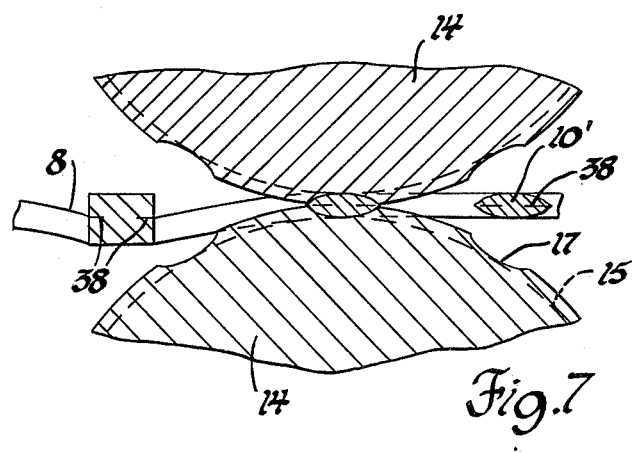
FIG. 7 is a partial sectional elevational view along the line 7—7 of FIG. 1.

FIGS. 5 and 6 depict a unit assembly 24 including a grid 26 made by this invention embedded in a fiber-laden (e.g., Dynel, polypropylene, etc.) leady positive paste 28. This grid 26 is shown as being flush-pasted but an over-pasted grid is possible and, in fact, preferred for automotive battery applications. The paper-bound pasted grid is enclosed in a conventional battery separator 32 (e.g., sintered polyvinyl chloride). This is most conveniently accomplished by folding the separator around the bottom of the pasted grid 26 and heat sealing the lateral edges 34 thereof. Spacing ribs 36 on the outside of the separator 32 provide space between the assembly 24 and the negative plate to permit a more efficient circulation of the electrolyte through the cell group.

While this invention has been disclosed in terms of specific embodiments thereof, it is not intended that it be limited thereto, but rather only to the extent set forth hereafter in the claims which follow.

I claim:

1. A method of making positive lead-acid storage battery grid stock from strips of large-grained, leadcalcium alloy having grain boundaries extending substantially continuously from one face of the strip to the other comprising:

advancing a narrow strip of said lead alloy, having a predetermined thickness, longitudinally between two rows of progressive dies and cutters, said strip having a central, longitudinal lug-forming portion and two expandable grid-forming portions flanking the lug-forming portion and extending to both longitudinal edges of the strip, and said rows comprising a plurality of dies and cutters which converge in incremental steps on the central lug-forming portion of the strip passing between them;

expanding the grid-forming portions along the longitudinal edges thereof by periodically shearing rectangular wire-like segments from said edges into a plurality of tiers of undulatory skeletal elements extending at acute angles to the plane of said lug-forming portions and such that successive tiers are offset one from the other and joined one to the other by a plurality of nodes which join the ends of successive segments in one tier to the centers of like segments in successive tiers, said nodes having rectangular, vertically transverse cross-sections and widths significantly greater than said predetermined thickness and equal to the sum of the widths of the adjoining skeletal elements, whereby two reticulated portions comprising a plurality of polygonal paste-retaining cells bounded by said skeletal elements and nodes are formed and extend at acute angles from the central portion in gull-wing fashion when viewed head-on;

leveling the thusly expanded strip by folding said reticulated portions down into nearly the same plane as said central portion;

uniformly stretching the reticulated portions in directions substantially perpendicular to the direction the strip is fed through the dies by urging each tier of skeletal elements in those directions independently of the other tiers to uniformly size the cells, stretch the reticulated portions to a predetermined width and slightly rotate the rectangular nodes such that diagonally opposing edges of the nodes become salient in the principal planes of the reticulated portions;

flattening the reticulated portions by further rotating said nodes and compressing said salient edges into plateaus and thereby convert the rectangular cross-sections of said nodes to polygonal cross-sections having two opposing sides thereof laying in planes substantially parallel to the faces of said central portions and spaced one from the other by a distance greater than said predetermined thickness but substantially less than twice said predetermined thickness; and cold working and reshaping the elements and nodes into generally rounded and elliptical transverse cross-sections respectively and such that any sharp edges and corners on the elements and nodes are substantially removed, nodal expansion cracks are submerged into the nodes, and any continuous, straight-through grain boundaries are reoriented and broken up whereby the corrosion resistance of the grids in improved.

* * * * *

UNITED STATES PATENT AND TRADEMARK OFFICE
CERTIFICATE OF CORRECTION

PATENT NO. : 3,947,936
DATED : April 6, 1976
INVENTOR(S) : Ellis G. Wheadon

It is certified that error appears in the above-identified patent and that said Letters Patent are hereby corrected as shown below:

Column 1, line 7, delete "Ser. No.".
Column 3, line 30, "batter" should read -- battery --.
Column 4, line 13, "C" should read -- $\underline{C}$ --;
Column 4, line 46, "C" should read -- $\underline{C}$ --.
Column 5, line 56, "X" should read -- $\underline{X}$ --.
Column 7, line 46, delete the second period (.).
Column 8, lines 2 and 3, "leadcalcium" should read
-- lead-calcium --;
Column 8, line 66, "in" should read -- is --.

Signed and Sealed this

Twentieth Day of July 1976

[SEAL]

Attest:

RUTH C. MASON
Attesting Officer

C. MARSHALL DANN
Commissioner of Patents and Trademarks